United States Patent
Matsumoto et al.

(10) Patent No.: US 8,081,688 B2
(45) Date of Patent: Dec. 20, 2011

(54) RADIO TRANSMITTING APPARATUS AND RADIO TRANSMITTING METHOD IN MULTICARRIER COMMUNICATION

(75) Inventors: Atsushi Matsumoto, Ishikawa (JP); Jun Cheng, Kyoto (JP); Masayuki Hoshino, Kanagawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 939 days.

(21) Appl. No.: 11/573,174

(22) PCT Filed: Jul. 12, 2005

(86) PCT No.: PCT/JP2005/012847
§ 371 (c)(1),
(2), (4) Date: Feb. 2, 2007

(87) PCT Pub. No.: WO2006/013705
PCT Pub. Date: Feb. 9, 2006

(65) Prior Publication Data
US 2007/0253498 A1    Nov. 1, 2007

(30) Foreign Application Priority Data
Aug. 6, 2004    (JP) .................... 2004-231114

(51) Int. Cl.
*H04K 1/10* (2006.01)
(52) U.S. Cl. ........ 375/260; 375/299; 375/349; 375/135; 375/136; 375/267; 375/347; 375/146; 375/147
(58) Field of Classification Search ............ 375/260, 375/299, 349, 135, 136, 267, 347, 146, 147
See application file for complete search history.

(56) References Cited

U.S. PATENT DOCUMENTS

| 2002/0172184 A1* | 11/2002 | Kim et al. ........... 370/344 |
| 2004/0009783 A1 | 1/2004 | Miyoshi |
| 2004/0190598 A1 | 9/2004 | Seki et al. |
| 2005/0105589 A1* | 5/2005 | Sung et al. ........... 375/130 |
| 2005/0157638 A1* | 7/2005 | Maltsev et al. ........ 370/203 |
| 2005/0287978 A1* | 12/2005 | Maltsev et al. ........ 455/403 |

FOREIGN PATENT DOCUMENTS

| JP | 2003032218 | 1/2003 |
| WO | 03021829 | 3/2003 |

OTHER PUBLICATIONS

PCT International Search Report dated Oct. 18, 2005.
N. Maeda, et al.; "Kudari Link Broadband Channel ni okeru OFCDM to FODM no Tokusei Hikaku," The Institute of Electronics Information and Communication Engineers Gijutsu Kenkyu Hokoku, Aug. 23, 2002, vol. 102, No. 282, pp. 95-100.

* cited by examiner

*Primary Examiner* — Kabir A Timory
(74) *Attorney, Agent, or Firm* — Dickinson Wright PLLC

(57) ABSTRACT

A radio transmitting apparatus wherein unnecessary consumption of transmission power can be suppressed and PAPR (Peak to Average Power Ratio) can be reduced in multicarrier communication. In the apparatus, a repetition part (105) replicates (repeats) each symbol outputted from a modulating part (103) to generate and output a plurality of identical symbols to an S/P part (107), which converts the symbol sequence outputted in series from the repetition part (105) into parallel symbol sequences and outputs them to an interleaver (109). The interleaver (109) then reorders the symbol sequences outputted from the S/P part (107) and outputs them to a mapping part (111), which removes, in accordance with the propagation path quality of each of subcarriers constituting OFDM symbols that are multicarrier signals, some of the identical symbols as replicated by the repetition part (105) and then maps the rest of the symbols onto subcarriers for application to an IFFT part (113).

9 Claims, 12 Drawing Sheets

RADIO TRANSMITTING APPARATUS AND RADIO TRANSMITTING METHOD IN MULTICARRIER COMMUNICATION

TECHNICAL FIELD

The present invention relates to a radio transmitting apparatus and radio transmitting method in multicarrier communication.

BACKGROUND ART

Recently, in radio communication, more particularly, in mobile communication, various information such as images and data, in addition to sound, have been an object of transmission. It is expected that necessity of high-speed transmission will further increase in the future, and therefore a radio transmission technology is required that realizes high transmission efficiency using limited frequency resources efficiently in order to perform high-speed transmission.

As one of such radio transmission technologies, OFDM (Orthogonal Frequency Division Multiplexing) can be cited (for example, see Non-patent document 1). It is known that the OFDM has a high frequency usage efficiency, a low interference between symbols under a multipath environment, and so on, and is effective for improving transmission efficiency.

Non-patent Document 1: WS No. 197, "OFDM modulation technology for digital broadcast/mobile communication," published by triceps Corporation, on Mar. 7, 2000.

DISCLOSURE OF THE INVENTION

Problems to be Solved by the Invention

In OFDM, qualities every subcarrier are greatly fluctuated by frequency selectivity fading caused by multipath. In this case, a quality of a signal allocated to a subcarrier on a trough of the fading is lowered, and demodulation of the signal becomes difficult. Therefore, quality improvement is required so that demodulation is possible.

As a technology for improving the quality in the OFDM, there exists a so-called repetition technology. The repetition technology is a technology that replicates a symbol to generate a plurality of identical symbols, maps the symbols onto a plurality of subcarriers to transmit them, and then combines the symbols on the receiver side to obtain a diversity effect.

In this repetition technology, when each of the identical symbols is mapped onto only a subcarrier having excellent propagation path quality, excess quality arises on the receiver side regarding the symbol, and meanwhile unnecessary transmission power is consumed on a transmitter side.

It is therefore an object of the present invention to provide a radio transmitting apparatus and radio transmitting method capable of suppressing unnecessary consumption of transmission power and reducing PAPR (Peak to Average Power Ratio).

Means for Solving the Problem

The radio transmitting apparatus of the present invention employs a configuration having: a replication section that replicates a symbol to generate a plurality of identical symbols; a mapping section that removes at least one symbol among the plurality of identical symbols in accordance with propagation path quality of each of the plurality of subcarriers and maps the rest of the plurality of identical symbols onto the plurality of subcarriers; a generation section that generates the multicarrier signal from an output of the mapping section; and a transmission section that transmits the multicarrier signal.

Advantageous Effect of the Invention

According to the present invention, in multicarrier communication, unnecessary consumption of transmission power can be suppressed, and PAPR can be reduced.

BEST MODE FOR CARRYING OUT THE INVENTION

Embodiments of the present invention will be described in detail hereinafter with reference to the accompanying drawings. A radio transmitting apparatus/radio receiving apparatus described below transmits/receives a multicarrier signal formed with a plurality of subcarriers, and is mounted on, for example, radio communication base station apparatus or radio communication terminal apparatus for use in mobile communication systems.

Embodiment 1

Figure 1:
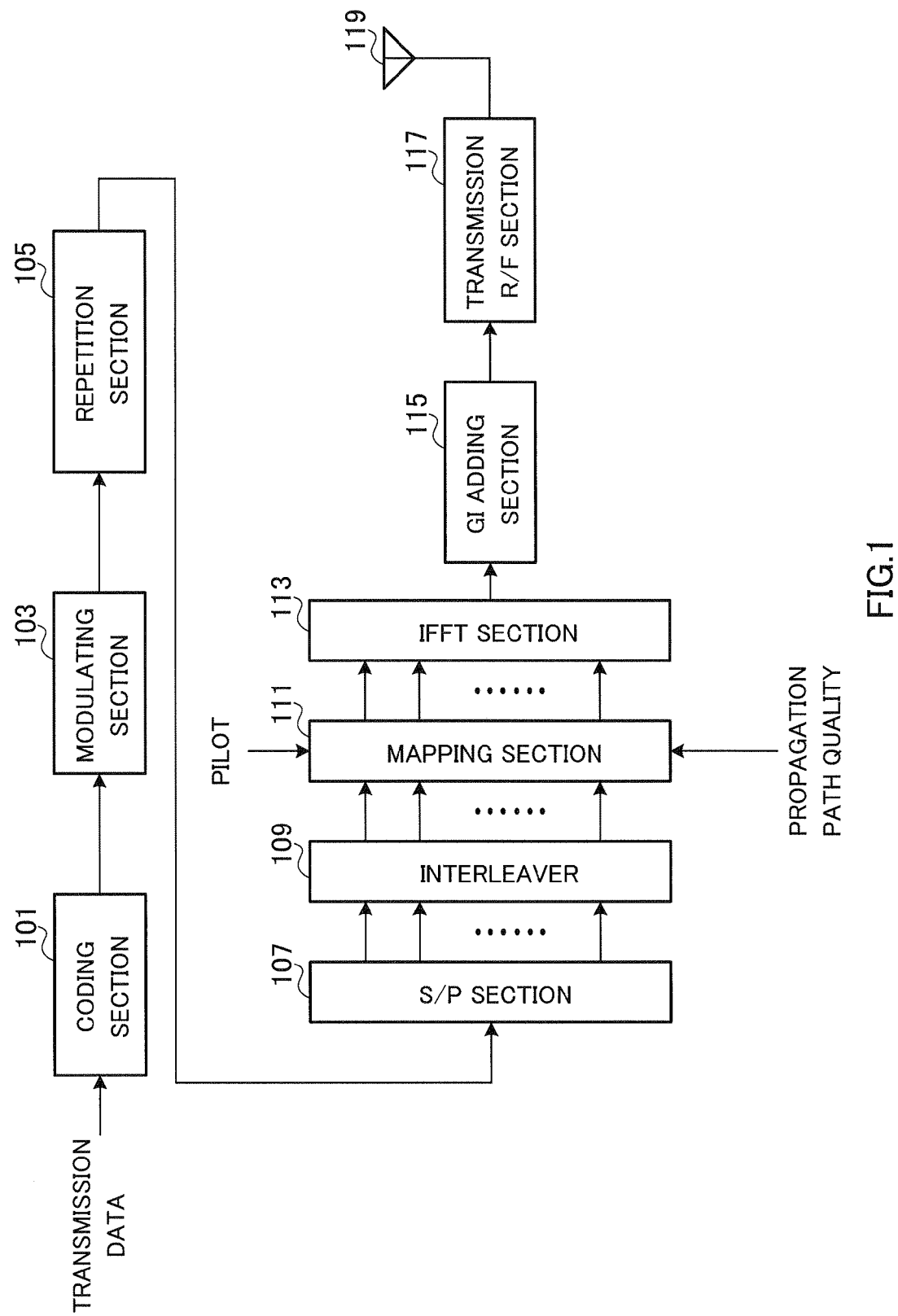
FIG. 1 is a block diagram showing a configuration of a radio transmitting apparatus according to Embodiment 1 of the present invention.

In the radio transmitting apparatus shown in FIG. 1, coding section 101 adds an error detection code and performs an error correction coding processing on inputted transmission data.

Modulating section 103 modulates an output from coding section 101 by a modulation scheme such as QPSK or 16QAM and generates a symbol.

Repetition section 105 replicates (i.e. repetition) each symbol outputted from modulating section 103 to generate a plurality of identical symbols, and outputs them to S/P section (Serial/Parallel conversion section) 107. In the following description, the plurality of identical symbols will be set as one unit and referred to as a repetition unit.

S/P section 107 converts a symbol sequence outputted in series from repetition section 105 into parallel symbol sequences, and outputs them to interleaver 109.

Interleaver 109 rearranges the symbol sequences outputted from S/P section 107 and outputs them to mapping section 111. That is, interleaver 109 interleaves the symbol sequences outputted from S/P section 107.

In accordance with the propagation path quality of each of subcarriers constituting an OFDM symbol that is a multicarrier signal, mapping section 111 removes some of the identical symbols replicated by repetition section 105, maps the rest of the symbols onto the subcarriers, and outputs them to IFFT section 113. Subcarriers (blank subcarriers), onto which no symbol is mapped, are generated among the plurality of subcarriers of the OFDM symbol. Moreover, in the following description, some of the identical symbols, which are removed by mapping section 111 and are consequently not transmitted, will be referred to as "non-transmission symbols."

Additionally, mapping section 111 maps a pilot symbol onto each subcarrier and multiplexes it with symbols outputted from interleaver 109. However, mapping section 111 does not map the pilot symbol onto blank subcarriers. In a FDD system, the pilot symbols are used to measure propagation path quality of each subcarrier by the radio receiving apparatus for receiving the OFDM symbol transmitted from the radio transmitting apparatus.

Moreover, in the FDD system, the propagation path quality of each subcarrier inputted to mapping section 111 is obtained from information obtained from the radio receiving apparatus by measuring the propagation path quality of each subcarrier and returning as feed back the measurement results to the radio transmitting apparatus. In a TDD system, since propagation path quality in transmission is similar to propagation path quality in reception, this propagation path quality is obtained by measuring propagation path quality of each subcarrier of the OFDM symbol transmitted from the radio receiving apparatus by the radio transmitting apparatus. Additionally, as propagation path quality, the propagation path fluctuation level, SNR, SIR, SINR, CIR, CINR or the like is applicable.

IFFT section 113 subjects the output from mapping section 111 to Inverse Fast Fourier Transform (IFFT) processing to generate an OFDM symbol that is a multicarrier signal, and outputs it to GI adding section 115.

The OFDM symbol outputted from IFFT section 113 is added a guard interval by GI adding section 115, subjected to predetermined radio processing such as up-conversion by transmission R/F section 117, and transmitted from antenna 119 to the radio receiving apparatus.

Next, the radio receiving apparatus for receiving the OFDM symbol transmitted from the radio transmitting apparatus shown in FIG. 1 will be described with reference to FIG. 2.

Figure 2:
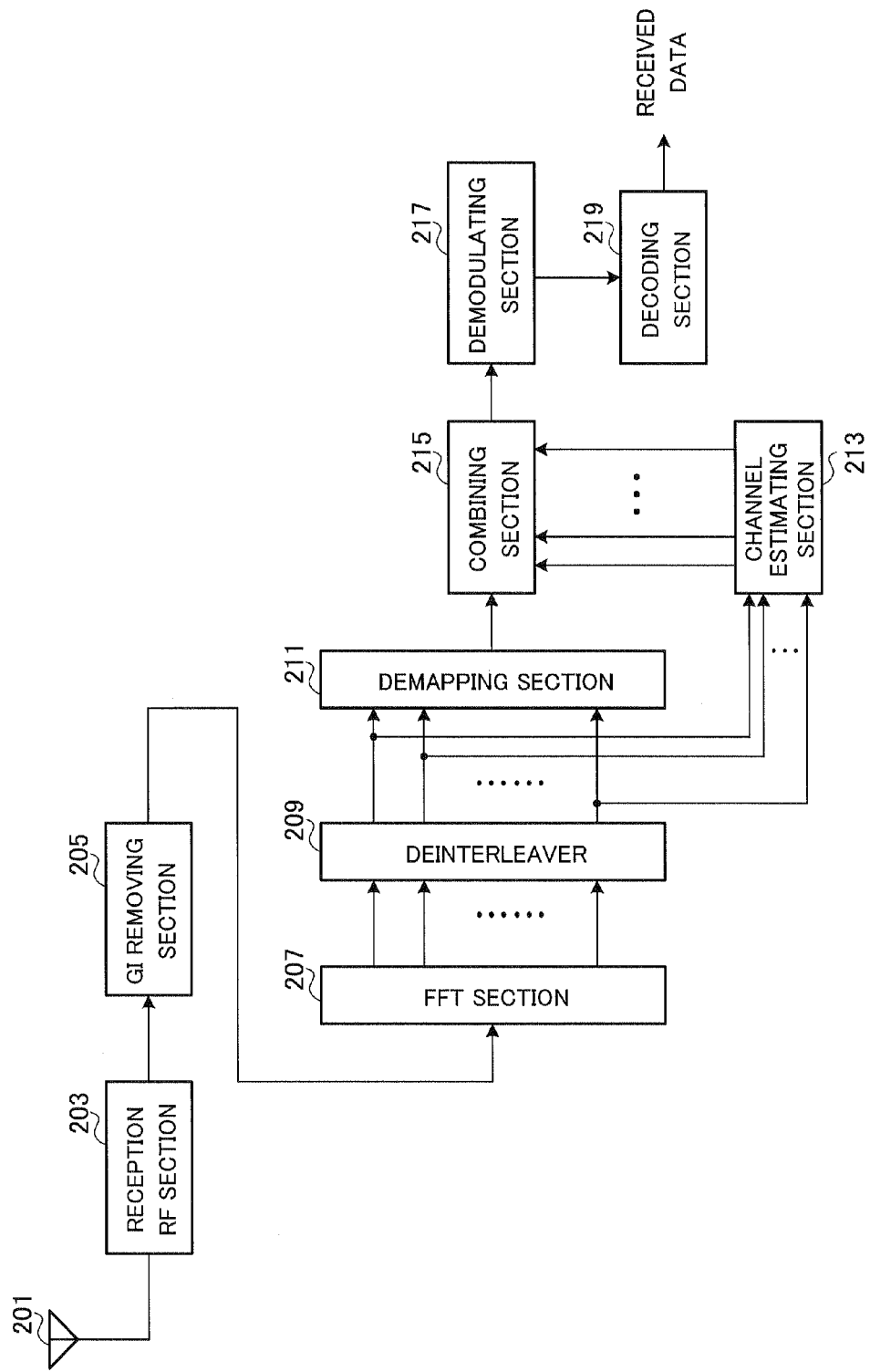
FIG. 2 is a block diagram showing a configuration of a radio receiving apparatus according to Embodiment 1 of the present invention.

In the radio receiving apparatus shown in FIG. 2, the OFDM symbol received via antenna 201 is subjected to predetermined radio processing such as down-conversion by reception RF section 203, the guard interval is removed by GI removing section 205, and the OFDM symbol having no guard interval is inputted to FFT section 207.

FFT section 207 subjects the OFDM symbol to Fast Fourier Transform (FFT) processing, extracts the symbol mapped onto the subcarriers, and outputs a symbol sequence to deinterleaver 209. Since some symbols are removed by mapping section 111 shown in FIG. 1, some symbols in the symbol sequence are missing.

Deinterleaver 209 rearranges the symbol sequence in the reverse order of the rearrangement performed in interleaver 109 in FIG. 1, to rearrange the order of the symbol sequence back to the order before the rearrangement by interleaver 109. That is, deinterleaver 209 deinterleaves the symbol sequence. The rearranged symbol sequence is outputted to demapping section 211. Further, the pilot symbol mapped onto each subcarrier is outputted to channel estimating section 213.

Demapping section 211 extracts the symbols in repetition units from the symbol sequence and outputs them to combining section 215. In this time, demapping section 211 extracts symbols from the subcarriers other than the blank subcarriers.

Channel estimating section 213 calculates a channel estimated value (for example, propagation path fluctuation level) of each of subcarriers other than blank subcarriers (i.e. subcarriers onto which symbols are mapped) using the pilot symbols, and outputs them to combining section 215.

Combining section 215 compensates the channel fluctuation of the symbol outputted from demapping section 211 using the channel estimated value. Then, combining section 215 assigns weight to each symbol after the channel fluctuation compensation and combines the symbols in the repetition unit.

The symbols after combining are demodulated by demodulating section 217, and error correction decoding and error detection are performed by decoding section 219. Thus, received data is obtained.

Next, operations of repetition section 105, interleaver 109 and mapping section 111 will be described in detail. In the following description, one OFDM symbol is formed with sixteen subcarriers, $f_1$ to $f_{16}$.

Figure 3:
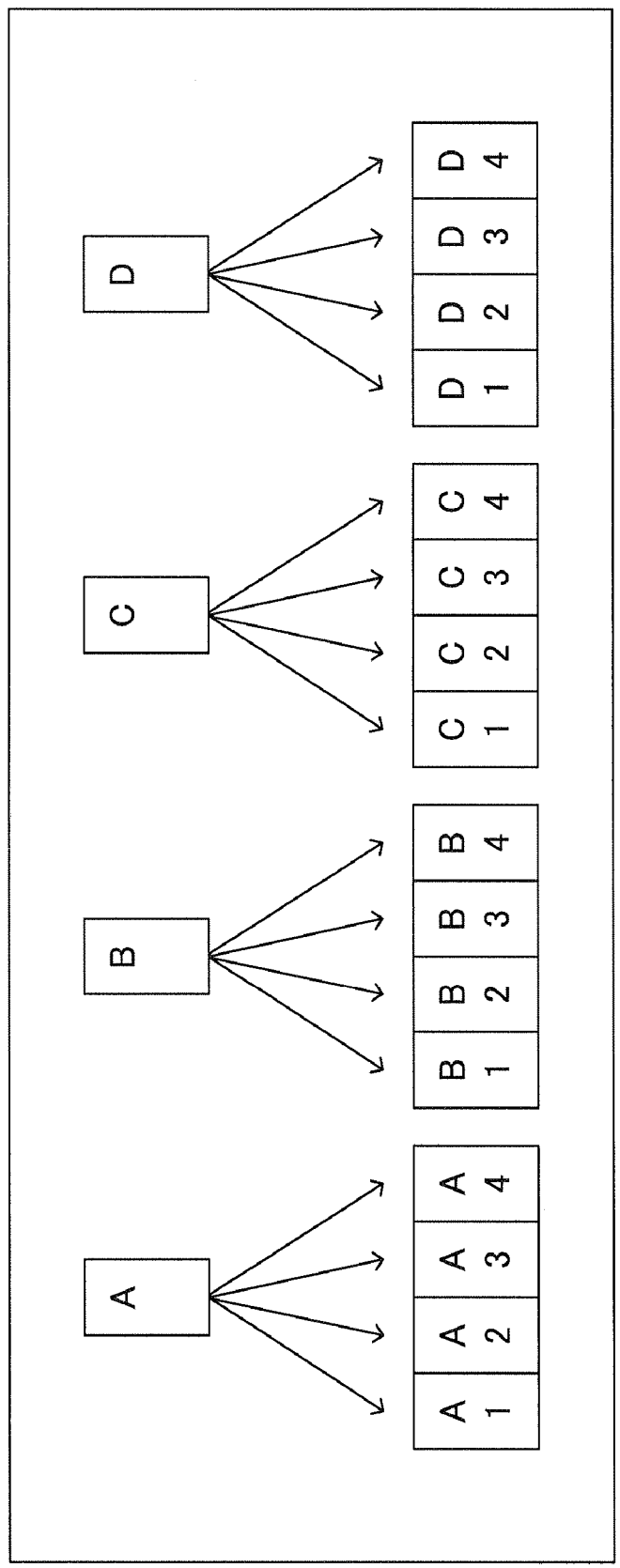
FIG. 3 is a diagram showing interleaving according to Embodiment 1 of the present invention.

As shown in FIG. 3, when the symbols outputted from modulating section 103 are defined as A, B, C and D, these symbols are replicated by repetition section 105 into sixteen symbols, A1 to A4, B1 to B4, C1 to C4 and D1 to D4. Here, the repetition unit is four symbols. Moreover, A1 to A4 are identical to A, B1 to B4 are identical to B, C1 to C4 are identical to C, and D1 to D4 are identical to D. The symbol sequence of A1 to A4, B1 to B4, C1 to C4 and D1 to D4, is converted into parallel by S/P section 107 and are inputted into interleaver 109.

Here, in the embodiment, as a method of selecting non-transmission symbols in each repetition unit, the following two methods are possible. Hereinafter, the selecting method 1 and selecting method 2 will be described respectively. Moreover, in both selecting method 1 and selecting method 2, when a combining result of a plurality of identical symbols in each repetition unit indicates an excess quality, at least one symbol is selected as a non-transmission symbol among the plurality of identical symbols and excluded from mapping.

(Selecting Method 1)

Figure 4:
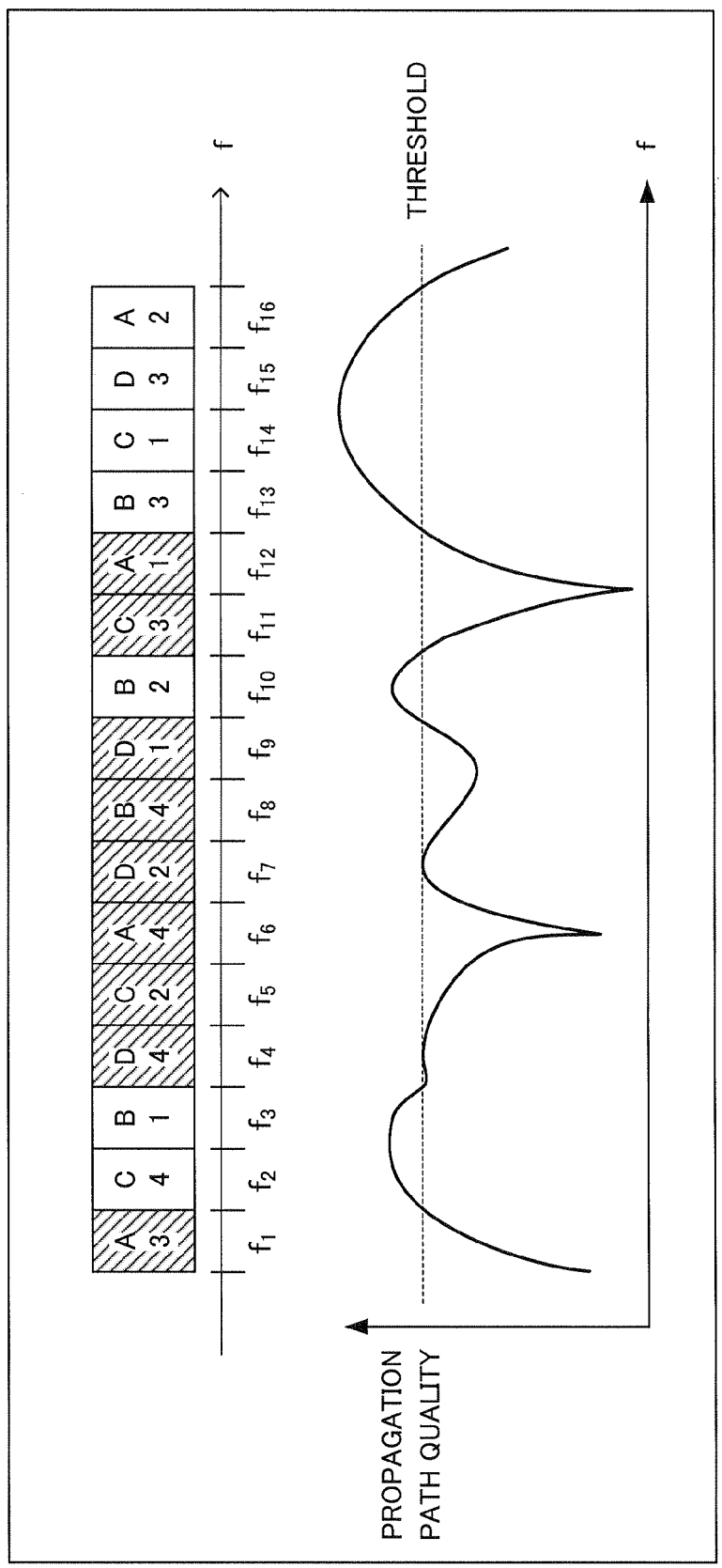
FIG. 4 is a diagram showing a mapping state according to Embodiment 1 of the present invention (selection example 1, before selection of non-transmission symbol)

In interleaver 109, the sixteen symbols, A1 to A4, B1 to B4, C1 to C4 and D1 to D4, are interleaved in accordance with a predetermined interleave pattern. Consequently, as shown in FIG. 4, the symbols, A1 to A4, B1 to B4, C1 to C4 and D1 to D4, are rearranged in such a way that A3, C4, B1, D4, ..., C1, D3 and A2 correspond to $f_1$, $f_2$, $f_3$, $f_4$, ..., $f_{14}$, $f_{15}$ and $f_{16}$, respectively. Then, the symbol sequence after interleaving is outputted to mapping section 111.

In mapping section 111, non-transmission symbols are determined in accordance with propagation path quality of $f_1$ to $f_{16}$. In this time, the non-transmission symbols are selected among the identical symbols in each repetition unit. In the present embodiment, as the selecting method 1, a method of leaving, among a plurality of identical symbols in each repetition unit, the symbols that are mapped onto subcarriers where propagation path quality is equal to or better than a threshold, selecting at least one symbol among the plurality of identical symbols as a non-transmission symbol, and excluding the non-transmission symbol from mapping, is employed.

For example, when propagation path quality is shown as in the graph of FIG. 4, subcarriers where propagation path quality is below the threshold, are $f_1$, $f_4$ to $f_9$, $f_{11}$ and $f_{12}$. Additionally, symbols mapped onto these subcarriers by interleaving by the interleaver 9 are A3, D4, C2, A4, D2, B4, D1, C3 and A1. On the other hand, subcarriers, of which each propagation path quality is not less than the threshold, are $f_2$, $f_3$, $f_{10}$ and $f_{13}$ to $f_{16}$, and the symbols mapped onto these subcarriers are C4, B1, B2, B3, C1, D3 and A2.

Here, if there are two identical symbols to be mapped onto subcarriers where propagation path quality is equal to or better than the threshold in a repetition unit, the combining result regarding the repetition unit can sufficiently fulfill desired quality by combining in combining section 215 of the radio receiving apparatus. That is, if there are two identical symbols to be mapped onto subcarriers where propagation path quality is equal to or better than the threshold, transmitting more identical symbols will result in excess quality in the radio receiving apparatus, and unnecessary transmission power is consumed in the radio transmitting apparatus. So, mapping section 111 selects symbols causing excess quality in each repetition unit and makes them non-transmission symbols.

To be more specific, focusing on the repetition unit of symbol A (A1 to A4), there is one symbol to be mapped onto subcarriers where propagation path quality is equal to or better than a threshold. Similarly, there are three symbols to be mapped onto subcarriers where propagation path quality is equal to or better than a threshold, in the repetition unit of symbol B (B1 to B4), there two symbols in the repetition unit of symbol C (C1 to C4), and there are one symbol in the repetition unit of symbol D (D1 to D4). Therefore, the combining results of the repetition unit of symbol B and the repetition unit of symbol C indicate excess quality in the radio receiving apparatus.

Figure 5:
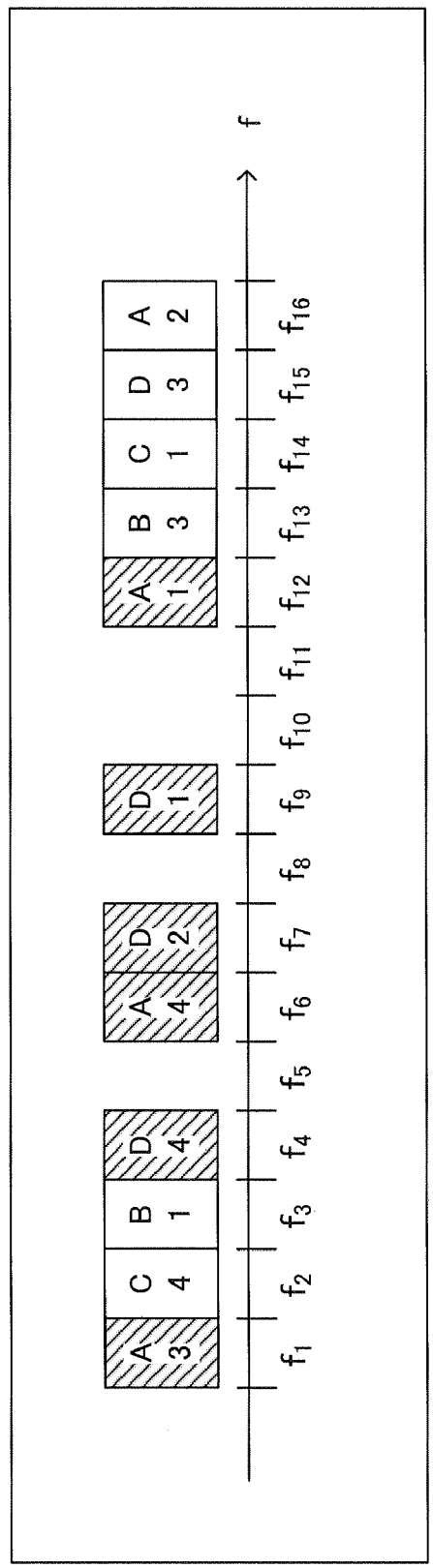
FIG. 5 is a diagram showing a mapping state according to Embodiment 1 of the present invention (selection example 1, after selection of non-transmission symbol)

Then, as shown in FIG. 5, mapping section 111 removes two symbols, B2 and B4, among symbols B1 to B4, as non-transmission symbols, and maps only the rest of the symbols, B1 and B3, onto subcarriers, $f_3$ and $f_{13}$, respectively. Additionally, mapping section 111 removes two symbols, C2 and C3, among symbols C1 to C4, as non-transmission symbols, and maps only the rest of the symbols, C1 and C4, onto subcarriers, $f_{14}$ and $f_2$, respectively. Mapping section 111 thus selects non-transmission symbols, prioritizing symbols mapped onto subcarriers where propagation path quality is below a threshold, over symbols mapped onto subcarriers where propagation path quality is equal to or better than the threshold. Moreover, all the symbols A1 to A4 and D1 to D4 are mapped onto subcarriers respectively. As a result, $f_5$, $f_8$, $f_{10}$ and $f_{11}$, become blank subcarriers.

(Selecting Method 2)

Figure 6:
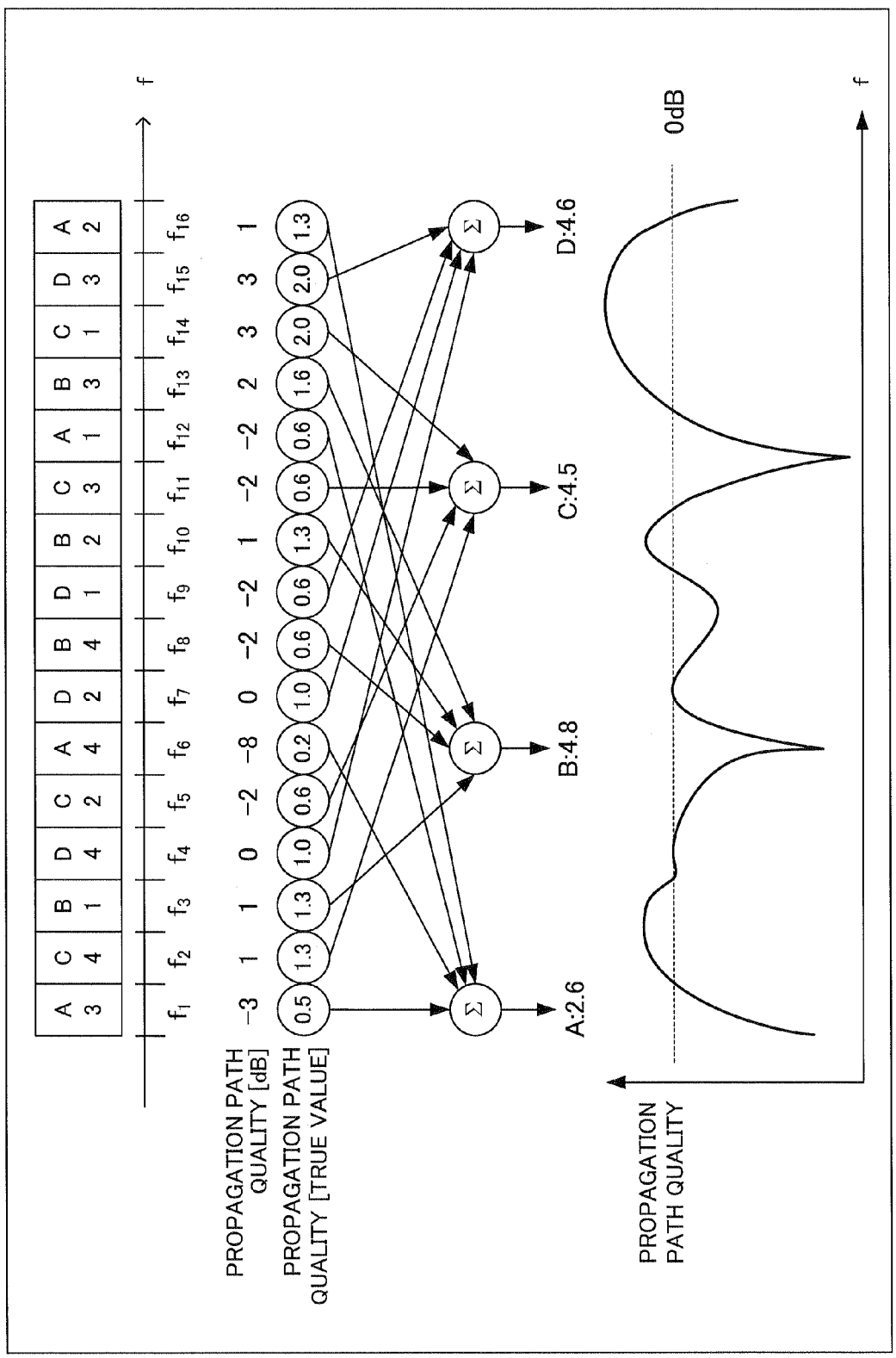
FIG. 6 is a diagram showing a mapping state according to Embodiment 1 of the present invention (selection example 2, before selection of non-transmission symbol)

In interleaver 109, similarly to selecting method 1, sixteen symbols, A1 to A4, B1 to B4, C1 to C4 and D1 to D4, are interleaved in accordance with a predetermined interleave pattern. Consequently, as shown in FIG. 6, the symbols, A1 to A4, B1 to B4, C1 to C4 and D1 to D4, are rearranged such that A3, C4, B1, D4, ..., C1, D3 and A2 correspond to $f_1$, $f_2$, $f_3$, $f_4$, ..., $f_{14}$, $f_{15}$ and $f_{16}$, respectively. Then, the symbol sequence after interleaving is outputted to mapping section 111.

In mapping section 111, the non-transmission symbols are determined in accordance with propagation path quality of $f_1$ to $f_{16}$. In this time, the non-transmission symbols are selected among the identical symbols in each repetition unit. In the present embodiment, as selecting method 2, a method of selecting, when total of propagation path quality of subcarriers where a plurality of identical symbols are mapped in each repetition unit is equal to or better than predetermined quality, at least one symbol among the plurality of identical symbols as a non-transmission symbol and excluding the non-transmission symbol from mapping.

For example, when propagation path quality is as shown in the graph of FIG. 6, propagation path quality [dB] of subcarriers $f_1$ to $f_{16}$ is as shown in FIG. 6. Additionally, propagation path quality [true value] is obtained by converting [dB] into [true value]. For example, the propagation path quality of $f_1$: −3 [dB] is equal 0.5 in [true value].

Mapping section 111 first sums up the propagation path quality [true value] of the subcarriers onto which the identical symbols of the repetition unit are mapped respectively. The repetition unit of the symbol A, A1 to A4, are mapped onto $f_1$, $f_6$, $f_{12}$ and $f_{16}$ respectively, propagation path quality of $f_1$, $f_6$, $f_{12}$ and $f_{16}$ is 0.5, 0.2, 0.6 and 1.3, respectively, and therefore the total of propagation path quality in the repetition unit of symbol A is 2.6. Similarly, the total of propagation path quality in the repetition unit (B1 to B4) of symbol B is 4.8, the total of propagation path quality in the repetition unit (C1 to C4) of symbol C is 4.5, and the total of propagation path quality in the repetition unit (D1 to D4) of symbol D is 4.6. The total of propagation path quality corresponds to quality of the symbols combined by combining section 215 of the radio receiving apparatus. That is, this total of propagation path quality corresponds to the quality of each repetition unit in the radio receiving apparatus.

Here, when a desired quality in the radio receiving apparatus is set to 3.0, the total of propagation path quality of the repetition units of symbols B, C and D each becomes equal to or greater than desired quality. Desired quality is 3.0, and any quality above will be excess quality. Thereupon, mapping section 111 selects a symbol causing excess quality in each repetition unit and makes the symbol as a non-transmission symbol. Additionally, mapping section 111 selects non-transmission symbols so that the number of non-transmission symbols becomes maximum in a range of fulfilling the desired quality in each repetition unit, in order to maximize a reduction amount of PAPR.

Concretely, focusing on the repetition unit of symbol B, B1, B4, B2 and B3 are mapped onto $f_3$, $f_8$, $f_{10}$ and $f_{13}$, respectively, and propagation path quality of $f_3$, $f_8$, $f_{10}$ and $f_{13}$ is 1.3, 0.6, 1.3 and 1.6, respectively. Therefore, any one of B1 to B4 is selected as a non-transmission symbol so that the total of propagation path quality becomes more or the desired quality even if the non-transmission symbol is generated. When there thus exist a plurality of candidates of non-transmission symbols, mapping section 111 selects non-transmission symbols so that resistance against frequency selective fading becomes highest and intervals between subcarriers where identical symbols in each repetition unit are mapped, becomes largest. Since the repetition unit of symbol B (B1 to B4) is mapped onto $f_3$, $f_8$, $f_{10}$ and $f_{13}$, the intervals between the subcarriers become largest when $f_{10}$ is made a blank subcarrier. Therefore, mapping section 111 selects B2 to be mapped onto $f_{10}$ as a non-transmission symbol regarding the repetition unit of symbol B. Thus, the quality of the repetition unit of the symbol B is 3.5.

Further, focusing on the repetition unit of the symbol C, C4, C2, C3 and C1 are mapped onto $f_2$, $f_5$, $f_{11}$ and $f_{14}$ respectively, and propagation path quality of $f_2$, $f_5$, $f_{11}$ and $f_{14}$ is 1.3, 0.6, 0.6 and 2.0 respectively. Therefore, two symbols, C2 and C3, are selected as non-transmission symbols so that the number of non-transmission symbols becomes maximum in a range where the total of propagation path quality fulfills desired quality. Thus, the quality of the repetition unit of symbol C is 3.3.

Furthermore, focusing on the repetition unit of the symbol D, D4, D2, D1 and D3 are mapped onto $f_4$, $f_7$, $f_9$ and $f_{15}$, respectively, and propagation path quality of $f_4$, $f_7$, $f_9$ and $f_{15}$ is 1.0, 1.0, 0.6 and 2.0 respectively. Therefore, either of two symbols, D1 and D2, and two symbols, D1 and D4, are selected as non-transmission symbols so that the number of non-transmission symbols becomes maximum in a range where the total of the propagation path quality fulfills desired quality. Similar to the above description, mapping section 111 selects two symbols, D1 and D2, as non-transmission symbols so that the intervals between the subcarriers become largest in the repetition unit. Thus, D1 and D2 are made non-transmission symbols and the quality of the repetition unit of symbol D is 3.0.

Moreover, since the total of propagation path quality of the repetition unit of symbol A is 2.6 and is less than 3.0 of desired quality, all the symbols A1 to A4 are mapped onto subcarriers.

Figure 7:
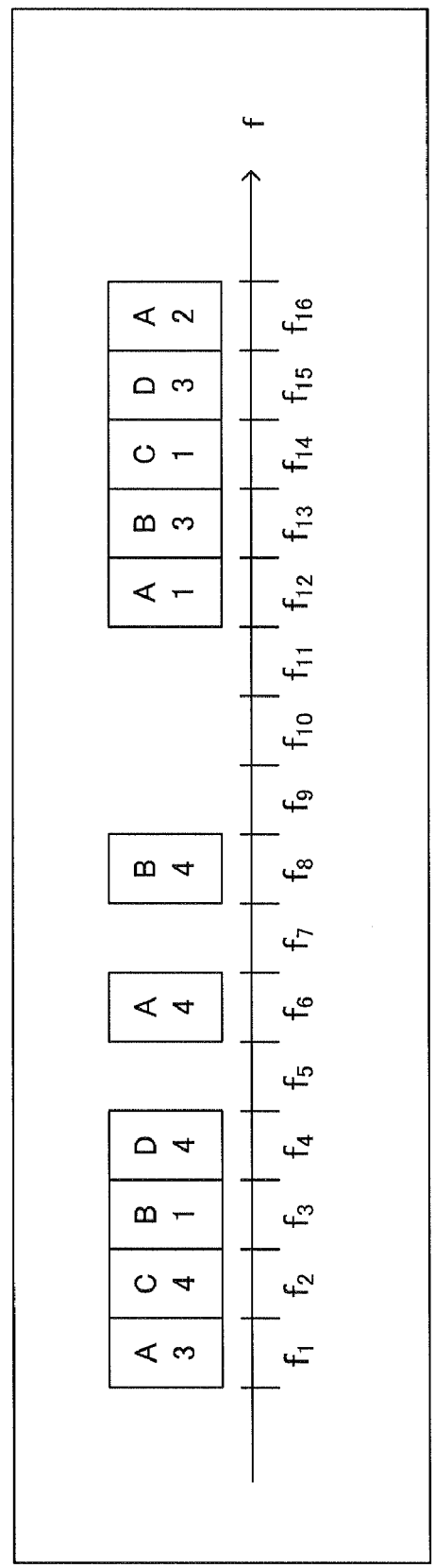
FIG. 7 is a diagram showing a mapping state according to Embodiment 1 of the present invention (selection example 2, after selection of non-transmission symbol)

Consequently, as shown in FIG. 7, the symbols mapped onto the subcarriers are A1 to A4, B1, B3, B4, C1, C4, D3 and D4, and $f_5$, $f_7$, $f_9$, $f_{10}$ and $f_{11}$, become blank subcarriers.

As described above, in the embodiment, the non-transmission symbols are selected by using the selecting method of either the selection example 1 or selection example 2. In the selection example 1, comparing with the selection example 2, though lighter processing for selecting non-transmission symbols is performed, whether or not excess quality is provided is decided based on rough criteria. On the other hand, in the selection example 2, comparing with the selection example 1, though heavy processing for selecting non-transmission symbols is performed, whether or not excess quality is provided is decided by more precise control. Therefore, either of the selecting methods may be employed in view of processing load to be allowed or quality precision to be required.

According to the present embodiment, symbols causing excess quality in each repetition unit are made non-transmission symbols and blank subcarriers are generated, so that unnecessary consumption of transmission power can be suppressed and PAPR can be reduced without influencing desired quality in the radio receiving apparatus. Additionally, since propagation path environments every cell under a multi-cell environment are different from each other, non-transmission symbols are independently generated every cell and differing blank subcarriers are generated, thereby reducing interference between cells.

Moreover, though the OFDM symbol (namely, FFT size) is employed as the unit of interleaving and deinterleaving in the above description, a frame may be employed as the units to be interleaved and deinterleaved.

Embodiment 2

A radio transmitting apparatus according to the present embodiment has a plurality of differing interleave patterns and performs interleaving in the interleave pattern whereby the number of non-transmission symbols becomes maximum, among the interleave patterns.

First, configurations of the radio transmitting apparatus and radio receiving apparatus according to the present embodiment will be described with reference to FIG. 8 and FIG. 9. However, the same numerals are attached to the same configurations as those of Embodiment 1 (FIG. 1 and FIG. 2) respectively, and description of the same configurations will be omitted.

Figure 8:
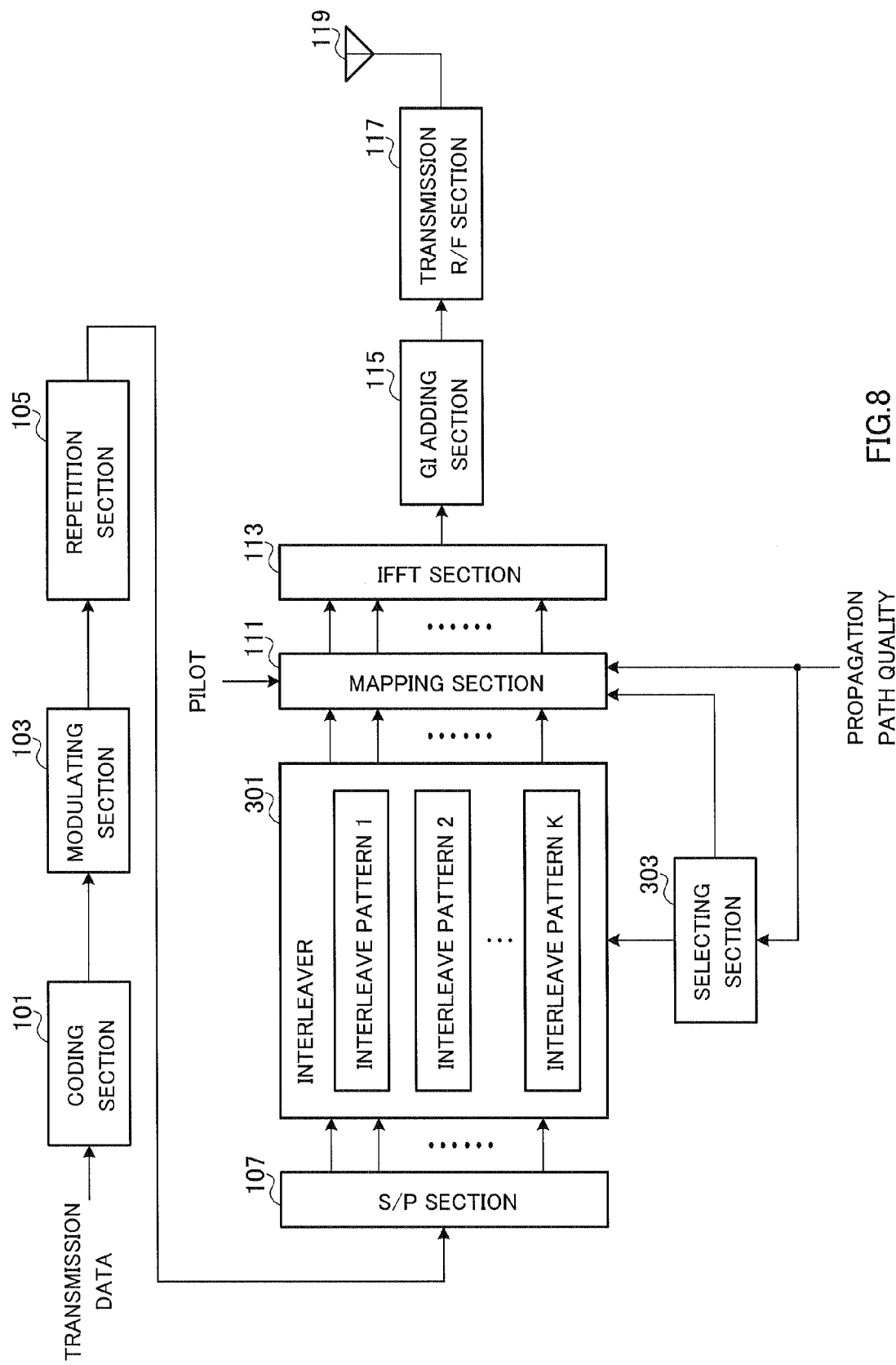
FIG. 8 is a block diagram showing a configuration of a radio transmitting apparatus according to Embodiment 2 of the present invention.

In the radio transmitting apparatus shown in FIG. 8, interleaver 301 has a plurality of differing interleave patterns 1 to K, and interleaves a symbol sequence using an interleave pattern selected among the plurality of interleave patterns by selection section 303.

Selection section 303 selects one of interleave patterns 1 to K in accordance with propagation path quality of each subcarrier, and outputs an interleave pattern number as a selection result, to interleaver 301 and mapping section 111. The interleave pattern selecting method in selection section 303 will be described below.

To report the selection result in selection section 303 to the radio receiving apparatus, mapping section 111 maps the interleave pattern number, as information indicating the selection result, onto one of the subcarriers (here, $f_1$).

Figure 9:
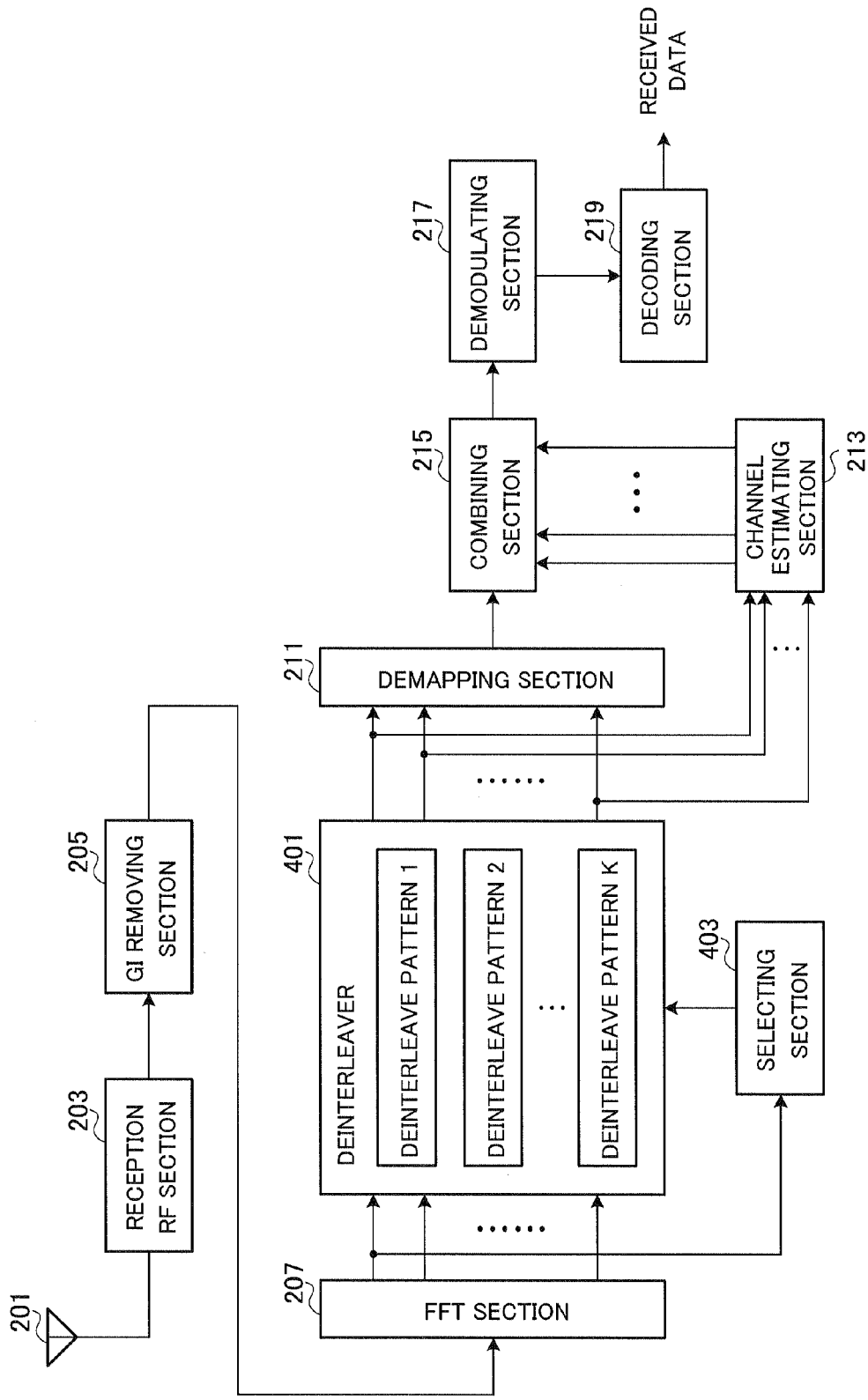
FIG. 9 is a block diagram showing a configuration of a radio receiving apparatus according to Embodiment 2 of the present invention.

On the other hand, in the radio receiving apparatus shown in FIG. 9, deinterleaver 401 has a plurality of differing deinterleave patterns 1 to K and deinterleaves a symbol sequence using an deinterleave pattern selected among the plurality of interleave patterns by selection section 403. The deinterleave patterns 1 to K correspond to the interleave patterns 1 to K, respectively. Deinterleaver 401 rearranges the order of the symbol sequence rearranged by interleaver 301 using the interleave patterns 1 to K, back to the order before the rearrangement at interleaver 301, using the deinterleave patterns 1 to K.

Selection section 403 learns the selection result in selection section 303 based on the interleave pattern number mapped onto $f_1$, and therefore selects one of the deinterleave patterns 1 to K in accordance with the interleave pattern number. Then, selection section 403 outputs the selection result to deinterleaver 401.

Next, the interleave pattern selecting method in selection section 303 of the radio transmitting apparatus will be described with reference to FIGS. 10 to 12. Moreover, in the following description, the selection example 1 described in Embodiment 1 is employed regarding the method of selecting non-transmission symbols. Additionally, the interleave patterns 1 to 3 are employed as the interleave pattern.

Figure 10:
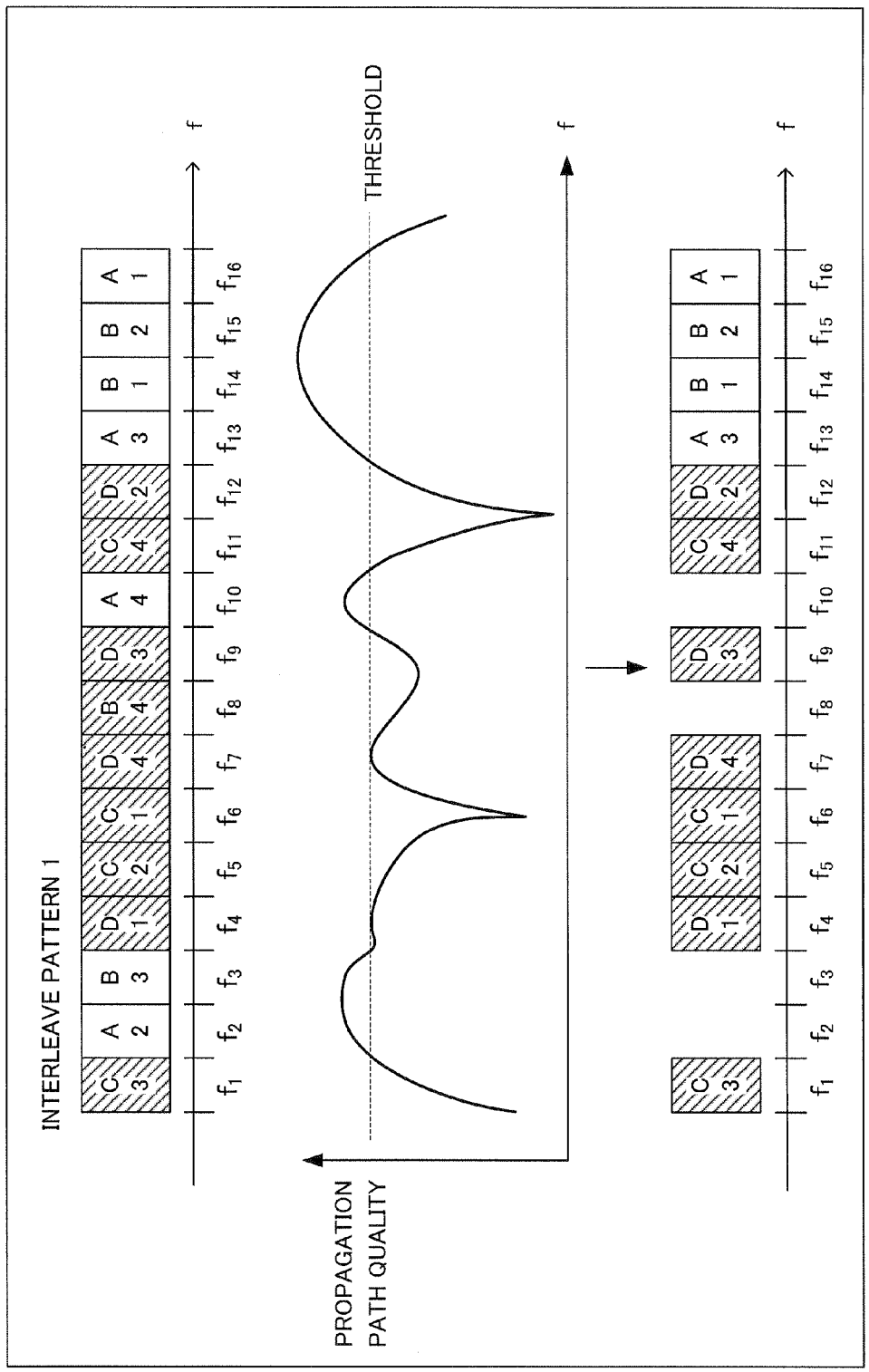
FIG. 10 is a diagram showing a mapping state according to Embodiment 2 of the present invention (interleave pattern 1)
Figure 11:
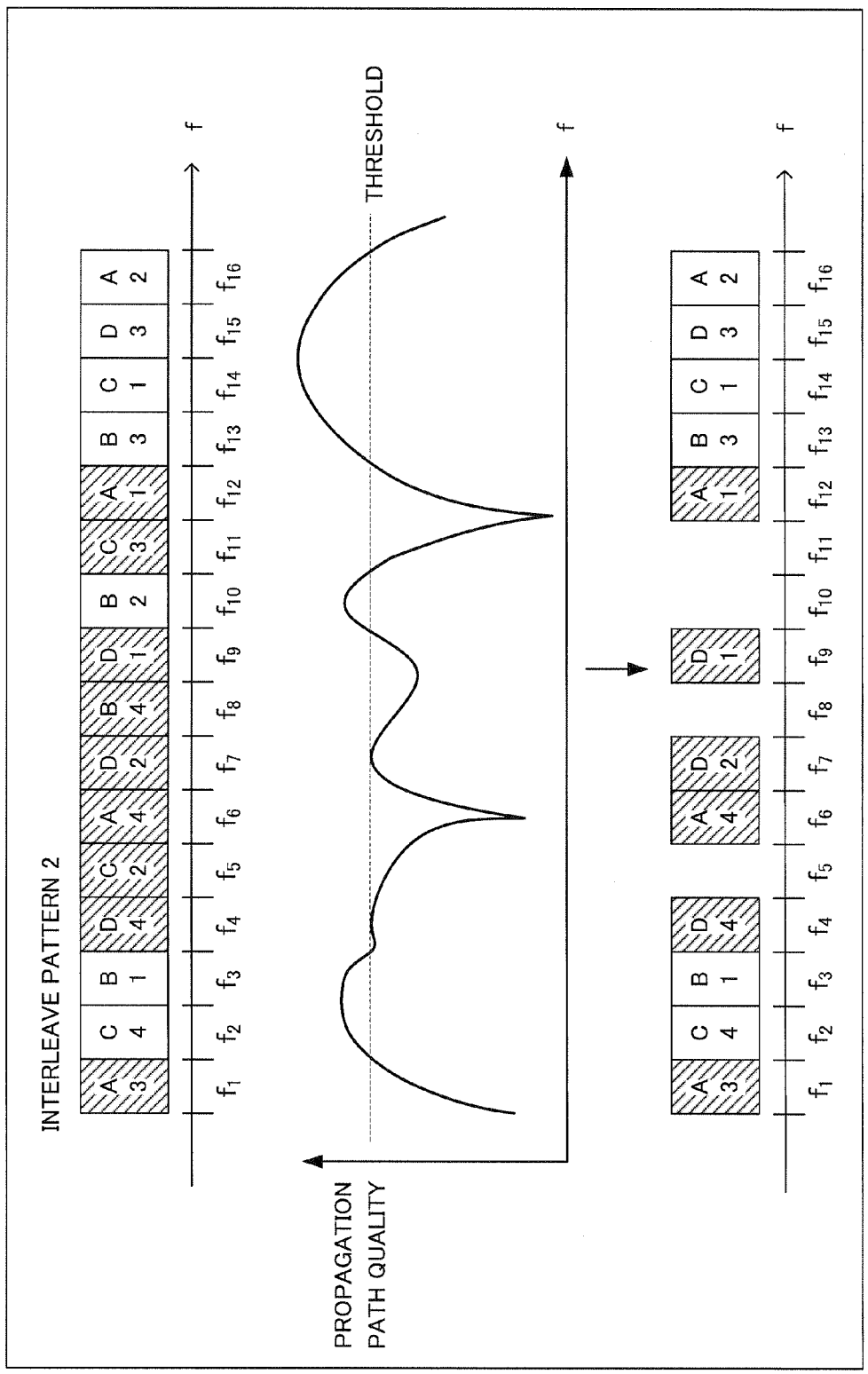
FIG. 11 is a diagram showing a mapping state according to Embodiment 2 of the present invention (interleave pattern 2)
Figure 12:
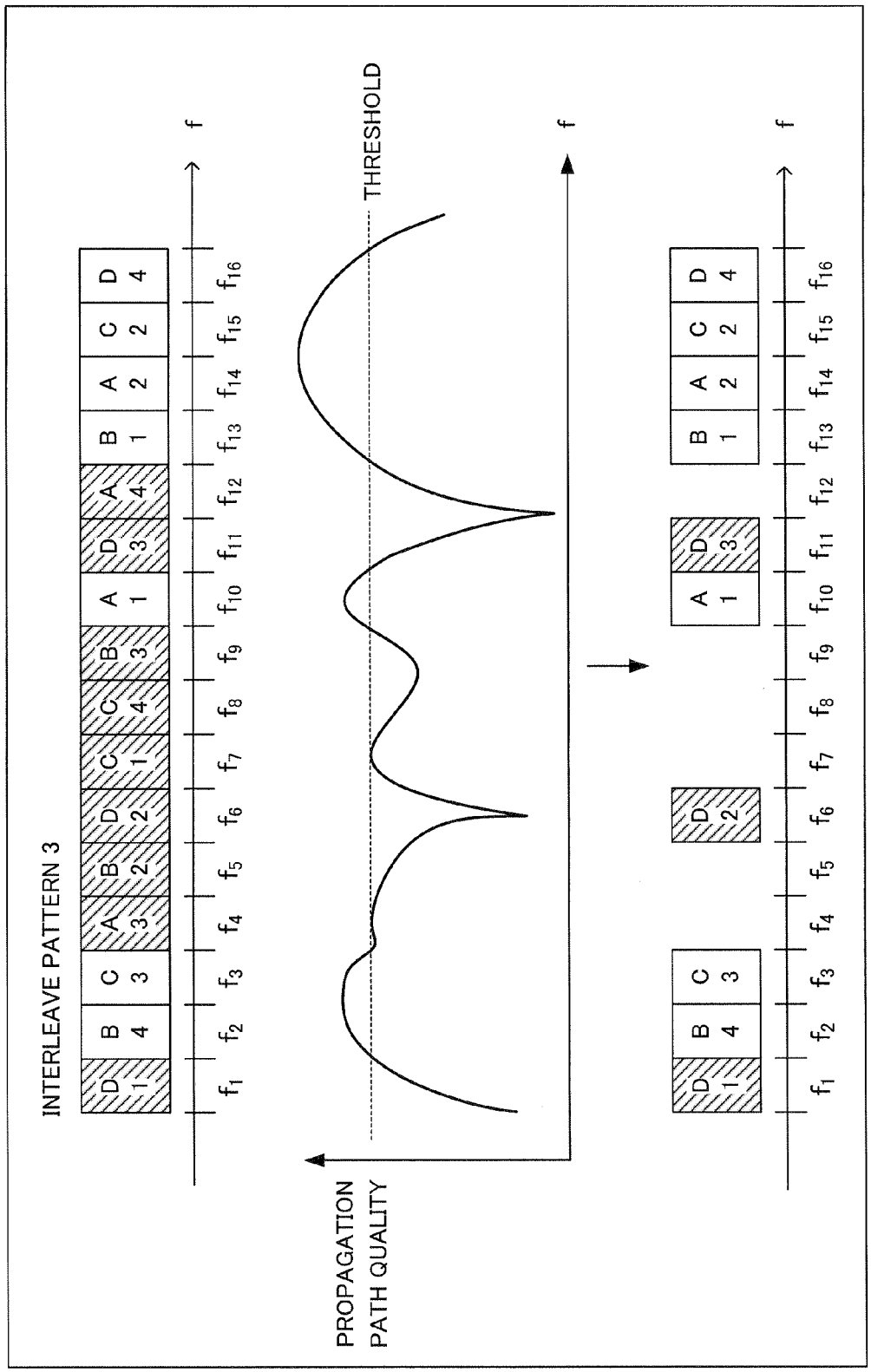
FIG. 12 is a diagram showing a mapping state according to Embodiment 2 of the present invention (interleave pattern 3).

FIG. 10 shows a case where the interleave pattern 1 is employed, FIG. 11 shows a case where the interleave pattern 2 is employed, and FIG. 12 shows a case where the interleave pattern 3 is employed. As understood by comparing FIGS. 10 to 12 with each other, the generated non-transmission symbols differ from each other in accordance with the interleave patterns in use even if the propagation path quality of the subcarriers is the same. That is, the number of generated non-transmission symbols depends on interleave patterns.

Thereupon, selection section 303 decides which interleave pattern generates the greatest number of non-transmission symbols, and determines the interleave pattern for use in interleaver 301. That is, selection section 303 selects the interleave pattern whereby mapping section 111 removes the maximum number of symbols.

To be more specific, in the interleave pattern 1 of FIG. 10, four non-transmission symbols are generated, and consequently four subcarriers, $f_2$, $f_3$, $f_8$ and $f_{10}$ become blank subcarrier. Further, in the interleave pattern 2 of FIG. 11, four non-transmission symbols are generated, and consequently four subcarriers, $f_5$, $f_8$, $f_{10}$ and $f_{11}$ become blank subcarriers. Furthermore, in the interleave pattern 3 of FIG. 12, six non-transmission symbols are generated, and consequently six subcarriers, $f_4$, $f_5$, $f_7$, $f_8$, $f_9$ and $f_{12}$ become blank subcarriers. Therefore, selection section 303 selects the interleave pattern 3 as the interleave pattern for use in interleaver 301.

According to the present embodiment, the interleave pattern, whereby the number of non-transmission symbols becomes maximum, is selected among the plurality of interleave patterns in accordance with propagation path quality, so that the greatest number of non-transmission symbols can be constantly generated following changes in propagation path quality, and, as a result, consumption of transmission power can be suppressed and PAPR can be reduced.

Moreover, as a plurality of different interleave patterns, a plurality of interleave patterns corresponding to a plurality of different delay spreads respectively or a plurality of interleave patterns corresponding to a plurality of different maximum Doppler frequencies respectively can be employed.

Additionally, though the configuration of reporting the interleave pattern number selected by the radio transmitting apparatus to the radio receiving apparatus is described above, the radio receiving apparatus can select the deinterleave pattern based on propagation path quality without this report. Since propagation path quality in transmission is similar to propagation path quality in reception in the TDD system, the radio receiving apparatus also can select the deinterleave pattern, in accordance with the propagation path quality of each subcarrier similarly to selection of the interleave pattern by the radio transmitting apparatus, by measuring propagation path quality of each subcarrier of the OFDM symbol transmitted from the radio transmitting apparatus.

Additionally, the radio communication base station apparatus and radio communication terminal apparatus in the above embodiments may be referred to as "Node B" and "UE," respectively. The subcarrier may be referred to as "tone."

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application in biotechnology is also possible.

The present application is based on Japanese patent application No. 2004-231114, filed on Aug. 6, 2004, the entire content of which is expressly incorporated herein by reference.

INDUSTRIAL APPLICABILITY

The present invention is suitable for use for radio communication base station apparatus or radio communication terminal apparatus used in mobile communication systems.

The invention claimed is:

1. A radio transmitting apparatus comprising:
a replication section that replicates a symbol to generate a plurality of identical symbols which respectively correspond to a plurality of subcarriers;
a mapping section that removes at least one symbol from the plurality of identical symbols when the plurality of identical symbols correspond to subcarriers having a total propagation path quality that is equal to or greater than a threshold, and removes none of the plurality of identical symbols when the plurality of identical symbols correspond to subcarriers having a total propagation path quality that is less than the threshold; and
a transmission section that transmits a multicarrier signal formed with the subcarriers onto which the unremoved symbols are mapped, wherein:
the mapping section excludes the removed at least one symbol and none of the plurality of identical symbols is mapped onto a subcarrier corresponding to the removed at least one symbol.

2. The radio transmitting apparatus according to claim 1, wherein, when a total of propagation path quality of subcarriers, to which the plurality of identical symbols correspond, indicates excess quality, the mapping section removes the symbol from the plurality of identical symbols.

3. The radio transmitting apparatus according to claim 1, further comprising:
an interleave section that interleaves the plurality of identical symbols using one of a plurality of different interleave patterns; and
a selection section that selects, among the plurality of different interleave patterns, an interleave pattern whereby the mapping section removes a maximum number of symbols.

4. The radio transmitting apparatus according to claim 3, wherein the mapping section maps information for reporting the interleave pattern selected by the selection section onto one of the plurality of subcarriers.

5. A radio communication base station apparatus comprising the radio transmitting apparatus according to claim 1.

6. A radio communication terminal apparatus comprising the radio transmitting apparatus according to claim 1.

7. A radio receiving apparatus comprising:
a reception section that receives the multicarrier signal transmitted from the radio transmitting apparatus according to claim 1;
a demapping section that demaps the unremoved symbols;
a combining section that combines the demapped symbols; and
a decoding section that decodes the combined symbols.

8. A radio transmitting method comprising:
replicating a symbol to generate a plurality of identical symbols which respectively correspond to a plurality of subcarriers;
removing at least one symbol from the plurality of identical symbols when the plurality of identical symbols correspond to subcarriers having a total propagation path quality that is equal to or greater than a threshold, and removing none of the plurality of identical symbols when the plurality of identical symbols correspond to subcarriers having a total propagation path quality that is less than the threshold;
performing a mapping operation to map unremoved symbols from the plurality of identical symbols onto subcarriers corresponding to the unremoved symbols; and transmitting a multicarrier signal formed with the subcarriers onto which the unremoved symbols are mapped, wherein:

in the mapping operation, the removed at least one symbol is excluded and none of the plurality of identical symbols is mapped onto a subcarrier corresponding to the removed at least one symbol.

9. An integrated circuit configured to control processing that comprises:

replicating a symbol to generate a plurality of identical symbols which respectively correspond to a plurality of subcarriers;

removing at least one symbol from the plurality of identical symbols when the plurality of identical symbols correspond to subcarriers having a total propagation path quality that is equal to or greater than a threshold, and removing none of the plurality of identical symbols when the plurality of identical symbols correspond to subcarriers having a total propagation path quality that is less than the threshold;

performing a mapping operation to map unremoved symbols from the plurality of identical symbols onto subcarriers corresponding to the unremoved symbols; and transmitting a multicarrier signal formed with the subcarriers onto which the unremoved symbols are mapped, wherein:

in the mapping operation, the removed at least one symbol is excluded and none of the plurality of identical symbols is mapped onto a subcarrier corresponding to the removed at least one symbol.

* * * * *